(12) United States Patent
Harper et al.

(10) Patent No.: US 9,990,491 B2
(45) Date of Patent: Jun. 5, 2018

(54) METHODS AND SYSTEMS FOR ASSESSING AND REMEDIATING ONLINE SERVERS WITH MINIMAL IMPACT

(71) Applicant: International Business Machines Corporation, Armonk, NY (US)

(72) Inventors: Richard E. Harper, Chapel Hill, NC (US); Ruchi Mahindru, Elmsford, NY (US); Mahesh Viswanathan, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

(21) Appl. No.: 15/000,084

(22) Filed: Jan. 19, 2016

(65) Prior Publication Data
US 2017/0206359 A1    Jul. 20, 2017

(51) Int. Cl.
G06F 21/00    (2013.01)
G06F 21/53    (2013.01)
H04L 12/24    (2006.01)
G06F 21/56    (2013.01)

(52) U.S. Cl.
CPC .......... *G06F 21/53* (2013.01); *G06F 21/568* (2013.01); *H04L 41/084* (2013.01); *H04L 41/28* (2013.01)

(58) Field of Classification Search
None
See application file for complete search history.

(56) References Cited

U.S. PATENT DOCUMENTS

| 7,945,611 | B2 | 5/2011 | Moutafov | |
| 2003/0084010 | A1* | 5/2003 | Bigus | G06F 11/2257 706/6 |
| 2006/0015641 | A1* | 1/2006 | Ocko | G06F 11/1662 709/236 |

(Continued)

OTHER PUBLICATIONS

C. Roberge, "Best Practice", Cressida Technology LTD, Whitepaper, 2004, p. 1-22.

(Continued)

*Primary Examiner* — Maung T Lwin
(74) *Attorney, Agent, or Firm* — Cantor Colburn LLP; Louis Percello

(57) ABSTRACT

Embodiments include methods, and computer system, and computer program products for assessing and remediating online servers with minimal impact. Aspects include: duplicating, in real-time at time T0, first instance of computer resources of first server into second instance of computer resources of second server, the first instance of computer resources having first instance of operating systems, first instance of applications and first instance of data and the second instance of computer resources having second instance of operating systems, second instance of applications and second instance of data, running assessment and remediation on the second instance of operating systems and applications of the second server, merging the second instance of data of the second server with the first instance of data of the first server, and swapping the identities of the first instance of computer resources of the first server and the second instance of computer resources of the second server.

18 Claims, 2 Drawing Sheets

(56) References Cited

U.S. PATENT DOCUMENTS

| | | | |
|---|---|---|---|
| 2007/0168692 A1* | 7/2007 | Quintiliano | G06F 11/1662 |
| | | | 714/4.1 |
| 2007/0276885 A1* | 11/2007 | Valiyaparambil | G06F 11/1451 |
| 2007/0283438 A1* | 12/2007 | Fries | G06F 11/1448 |
| | | | 726/24 |
| 2008/0077657 A1 | 3/2008 | Tagami et al. | |
| 2011/0060722 A1* | 3/2011 | Li | G06F 11/2038 |
| | | | 707/649 |
| 2011/0184916 A1* | 7/2011 | Tevis | G06F 11/1456 |
| | | | 707/675 |
| 2012/0266234 A1* | 10/2012 | Ocko | H04L 67/2861 |
| | | | 726/17 |
| 2013/0024720 A1* | 1/2013 | Aggarwal | G06F 11/2025 |
| | | | 714/4.11 |
| 2013/0268488 A1* | 10/2013 | Jackiewicz | G06F 9/4868 |
| | | | 707/624 |
| 2014/0122661 A1 | 5/2014 | Takata et al. | |
| 2014/0149494 A1* | 5/2014 | Markley | H04L 67/34 |
| | | | 709/203 |
| 2015/0256436 A1 | 9/2015 | Stoyanov et al. | |
| 2016/0011952 A1* | 1/2016 | Tejerina | G06F 11/30 |
| | | | 714/41 |

OTHER PUBLICATIONS

Sandboxie Holdings, LLC. [online]; [retrieved on Dec. 19, 2015]; retrieved from the Internet http://www.sandboxie.com/; "Sandboxie: Trust No Program" 2 pgs.

\* cited by examiner

METHODS AND SYSTEMS FOR ASSESSING AND REMEDIATING ONLINE SERVERS WITH MINIMAL IMPACT

BACKGROUND

The present disclosure relates generally to information technology, and more particularly to methods, systems and computer program products for assessing and remediating online servers with minimal impact.

Computer server is a computer program or a machine that share computer resources such as hardware, software such as operating systems and application programs and data among a group of computers in a client-server model. Clients may run on the same computer server or may connect to the computer server over a network. Typical computing servers may include database servers, communication servers, media servers, file servers, mail servers, print servers, web servers, game servers, and application servers.

When certain computer servers are infected by certain virus, or upon suspicion of compromised computer servers, software installed and/or running on the computer servers is out of date, when the software needs to be upgraded and/or patched, these computer servers are known as not in compliance. In order to remedy such noncompliances, a planned maintenance is usually scheduled to disinfect the computer servers, eliminate the security breaches, and/or install patches. However, such a planned maintenance activity is often disruptive, and after the fact. High availability computer servers running mission critical workload need to be kept compliant at all times, and can't tolerate any service disruptions.

In order to keep these mission critical or high availability computer servers outage free, and keep them in compliance at all time, it is desirable to proactively and/or periodically perform assessments, and remediate the computers servers with minimal impact and without services disruptions.

Therefore, heretofore unaddressed needs still exist in the art to address the aforementioned deficiencies and inadequacies.

SUMMARY

In an embodiment of the present invention, a method of assessing and remediating online servers with minimal impact may include: duplicating, in real-time at time T0, a first instance of computer resources of a first server into a second instance of computer resources of a second server, each of the first instance of computer resources and the second instance of computer resources including operating systems, applications and data, running assessment and remediation on the second instance of operating systems and applications of the second server while the first server is still in production, merging the second instance of data of the second server with the first instance of data of the first server, and swapping the identities of the first instance of computer resources of the first server and the second instance of computer resources of the second server.

In another embodiment of the present invention, a computer system for assessing and remediating online servers with minimal impact may include a processor, and a memory storing computer executable instructions for the computer system. When the computer executable instructions are executed at the processor, the computer executable instructions cause the computer system to perform: duplicating, in real-time at time T0, a first instance of computer resources of a first server into a second instance of computer resources of a second server, each of the first instance of computer resources and the second instance of computer resources including operating systems, applications and data, running assessment and remediation on the second instance of operating systems and applications of the second server, merging the second instance of data of the second server with the first instance of data of the first server, and swapping the identities of the first instance of computer resources of the first server and the second instance of computer resources of the second server.

In yet another embodiment of the present invention, a non-transitory computer readable storage medium may store computer executable instructions. When these computer executable instructions are executed by a processor of a computer system, these computer executable instructions cause the computer system to perform: duplicating, in real-time at time T0, a first instance of computer resources of a first server into a second instance of computer resources of a second server, each of the first instance of computer resources and the second instance of computer resources including operating systems, applications and data, running assessment and remediation on the second instance of operating systems and applications of the second server, merging the second instance of data of the second server with the first instance of data of the first server, and swapping the identities of the first instance of computer resources of the first server and the second instance of computer resources of the second server.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
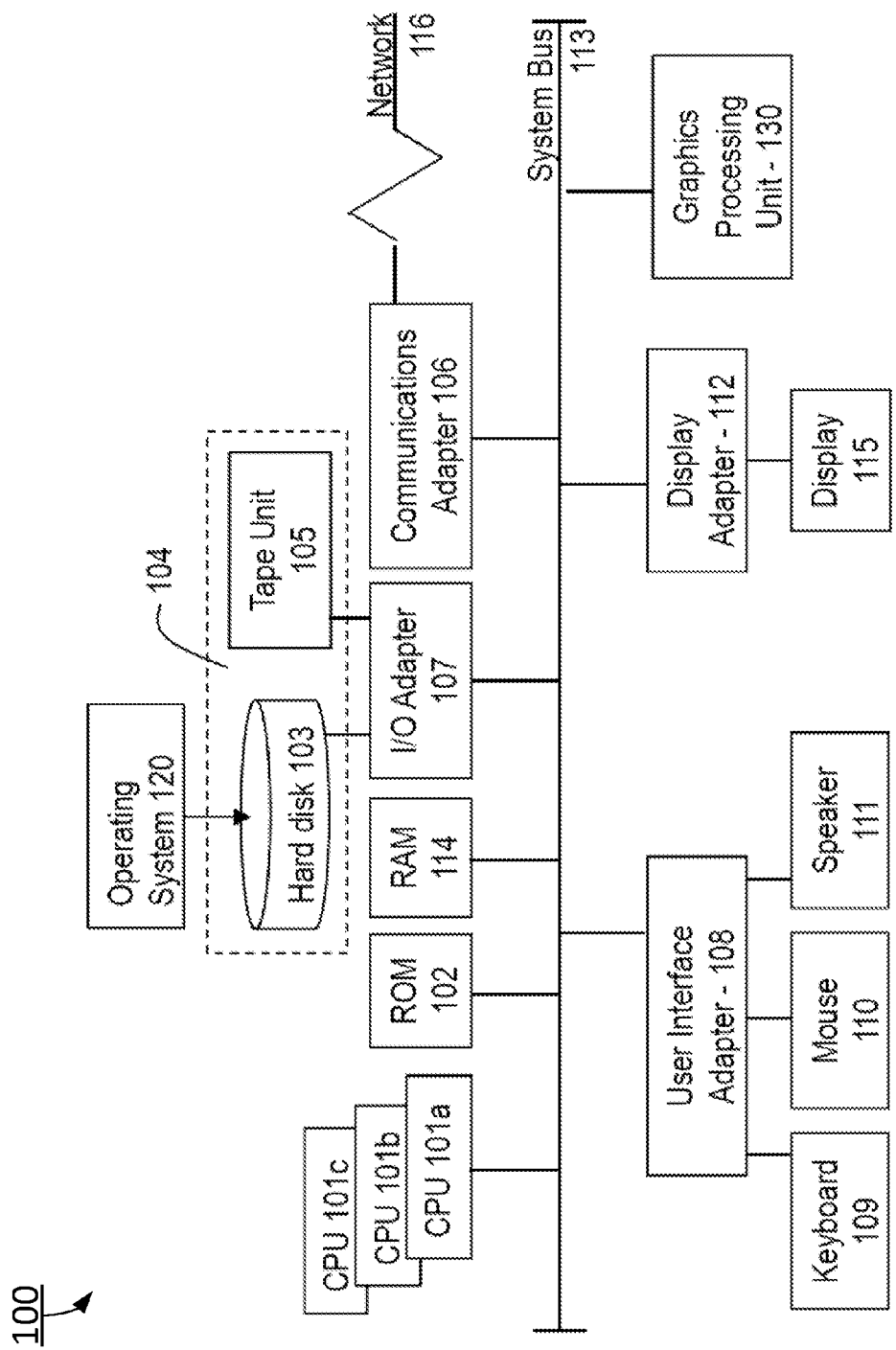
FIG. 1 is a block diagram illustrating an exemplary computer system for assessing and remediating online servers with minimal impact according to certain embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-2, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, there is shown an embodiment of a computer system 100 for assessing and remediating online servers with minimal impact and implementing the teachings herein. In this embodiment, the computer system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

In certain embodiments, the computer system 100 may be connected to a first server (not shown in FIG. 1) having a first storage and at least one first processor, and a second server (not shown in FIG. 1) having a second storage and at least one second processor, respectively. The first server may be an outage-free mission critical production server and a high availability production server. The second server may be a server that is substantially similar to the first server in hardware and software configuration.

In certain embodiments, the hard disk 103 stores software for the computer system 100 for assessing and remediating online servers with minimal impact. In certain embodiments, when the software is executed at the processor 101, the computer system 100 may perform: duplicating, in real-time at time T0, a first instance of computer resources of the first server into a second instance of computer resources of the second server, each of the first instance of computer resources and the second instance of computer resources including operating systems, applications and data, running assessment and remediation on the second instance of operating systems and applications of the second server, merging the second instance of data of the second server with the first instance of data of the first server, and swapping the identities of the first instance of computer resources of the first server and the second instance of computer resources of the second server.

In certain embodiments, once the computer system 100 decides to perform remediation of the first server either proactively, or on suspicion of a compromised first server, the computer system 100 may instruct the first server to perform: first, quiescing the applications of the first server for a time period for duplicating the first instance of computer resources of the first server into the second instance of computer resources of the second server. The time period may be substantially equal to the time the first server to copy the computer resources onto the second server, or take a flash copy (FC) of the first storage of the first server, a process that can consume just a few seconds. Second, duplicating the first instance of computer resources of the first server into the second instance of computer resources of the second server. The duplicating may include duplicating the software, and application programs, and data from the first server to the second server. Once the duplicating is completed, resuming the applications of the first server to full performance, and then inhibiting all updates on the first server other than normal data traffic such as database and application data updates. At this point, after the software and application programs have been duplicated onto the second server, the first server may operate as normal, and only database and application data are updated on the first server. The software and application programs of the first server are frozen at the time T0, and any updates, upgrades, or patches will not be applied to the first server.

In certain embodiments, when the first instance of computer resources of the first server is duplicated onto the second instance of computer resources of the second server, the computer system 100 may perform necessary assessment and remediation when the remediation is found to be necessary.

The computer system 100 may instruct the second server to perform: booting up the second server based on the duplicated first server. In one embodiment, the second server is booted up into a protected sandbox based on the duplicated first server. Then computer system 100 may instruct the second server to run assessment and remediation on the second server. The assessment and remediation may include assessments and remediation in the areas of performance, security, and patch. In certain embodiments, the computer system 100 may run wide-sense assessment and remediation on the second server, including: performing virus scans, IBM Watson Security Tool (WST) style security assessments which assess a wide range of potential security hazards, applying patches, performing data compaction, and optimizing performance of the second server.

In certain embodiments, when the assessment and remediation are completed, the computer system 100 may further instruct the second server to verify and validate integrity of the remediation by running a variety of application tests to ascertain the second server is in a good operation condition to take over the operation of the first server.

In certain embodiments, once the assessment and remediation are completed and the verification and the validation of the integrity of the remediation are completed, the computer system 100 may merge application data updates of the first server with remediation updates of the second server at a time T1. In one embodiment, the computer system 100 may perform the merger using a log-shipping merging, when the first server supports log-shipping and replay. The log-shipping merging may include: instructing the first server to connect to the second server, instructing the first server to ship all logs to the second server between time T0 and time T1, and instructing the second server to replay all logs received. In another embodiment, the computer system 100 may perform the merger using a duplicating data merging. The duplicating data merging may include: instructing the first server to perform a flash copy of data volumes from the first server, and join the flash copy of the data volumes from the first server with the second server.

In certain embodiments, when the assessment and remediation are completed, and application data of the first server during the assessment and remediation of the second server is merged with application data of the second server, the computer system 100 may perform identities swap between the first server and the second server. The identities swapping may include: quiescing the first server when the second server is fully synchronized with the first server, swapping identity of the second server with identity of the first server, and deleting the first server. In one embodiment, the computer system 100 may swap the identities of the first server and the second server using techniques from disaster recovery (DR) failover. In another embodiment, the computer system 100 may swap the identities of the first server and the second server using techniques from high availability (HA) failover. In yet another embodiment, the computer system 100 may swap the identities of the first server and the second server by simply updating of the hostname and IP address of the second server.

In certain embodiments, the aspects of the present invention may be used for further enhancing assessment and remediation for clusters, by assessing and remediating one node of the cluster at a time, while keeping the cluster running at full redundancy. High availability is maintained during assessment and remediation and no performance degradation or failover will occur. In certain embodiments, the aspects of the present invention may be extended to assessment and remediation of a collection of servers (e.g., a cluster, or client workload group) all at once. In other exemplary embodiments, the aspects of the present invention may be extended to assessment and remediation of mobile/personal computers with sufficient storage to support a secondary server. The aspects of the present invention may not be limited to virtual servers since this will work for non-virtual servers as well.

Figure 2:
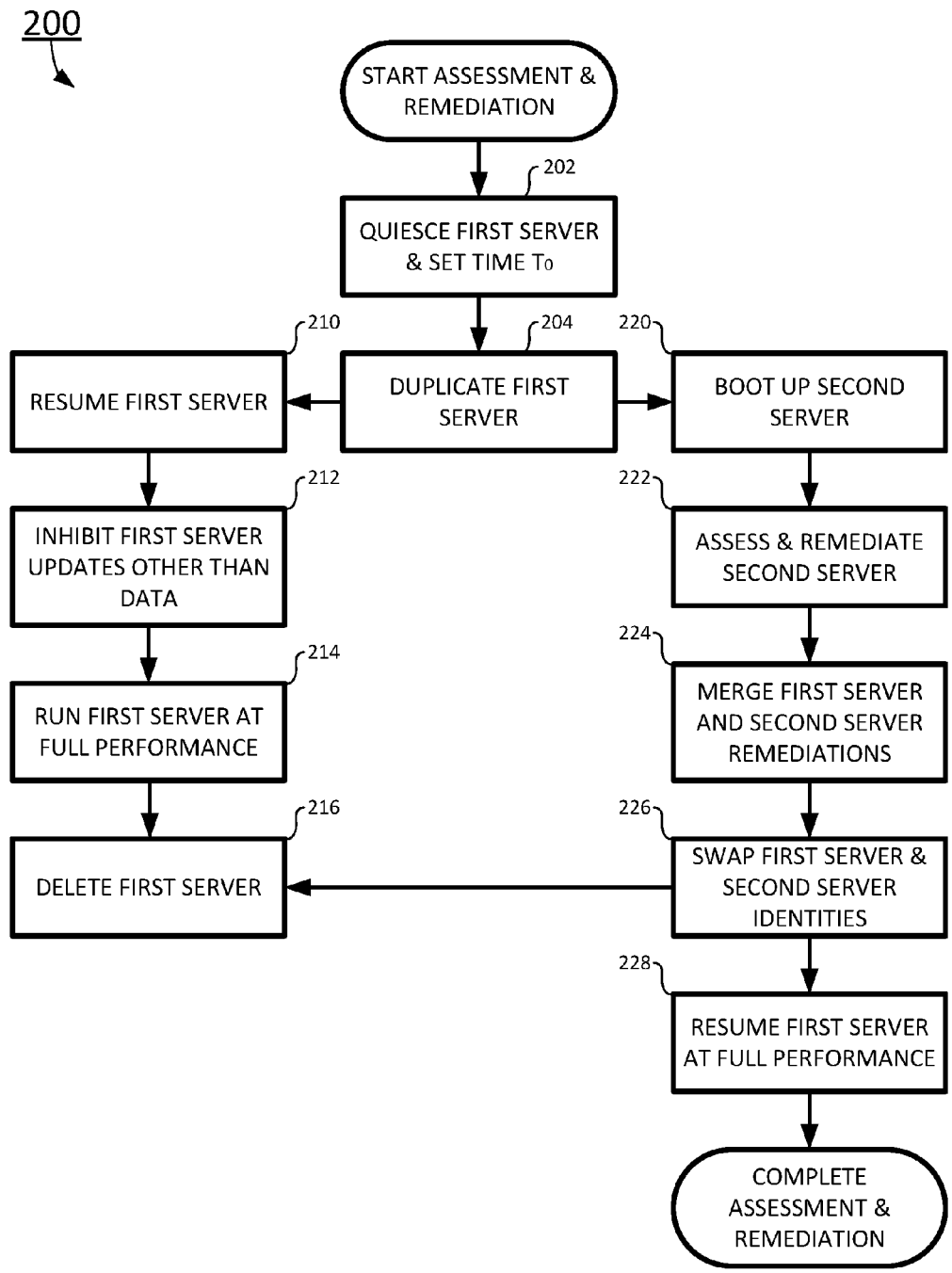
FIG. 2 is a flow chart of an exemplary method of assessing and remediating online servers with minimal impact according to certain embodiments of the present invention.

Referring now to FIG. 2, a flow chart of an exemplary method 200 of the computer system 100 for assessing and remediating online servers with minimal impact is shown according to certain exemplary embodiments of the present disclosure. As shown at block 202, once the computer system 100 decides to perform an assessment and remediation of a first server either proactively, or on suspicion of compromised first server, the computer system 100 may instruct the first server to quiesce the applications of the first server for a time period for duplicating a first instance of computer resources of the first server into a second instance of computer resources of a second server. The time period may be substantially equal to the time the first server to copy the computer resources onto the second server, or take flash copy (FC) of the first storage of the first server.

At block 204, the computer system 100 may instruct the first server to duplicate the first instance of computer resources of the first server into the second instance of computer resources of the second server. The duplicating may include duplicating the software, application programs, and data from the first server to the second server. The method 200 branches to block 210 for operations on the first server side, and to block 220 for operations on the second server side.

At block 210, once the duplicating is completed, the computer system 100 may instruct the first server to resume applications of the first server to full performance.

At block 212, the computer system 100 may instruct the first server to inhibit all updates on the first server other than normal data traffic such as database (DB) updates. At this point, the software and application programs are duplicated onto the second server, and the first server may operate as normal, and only data are updated. The software and application programs of the first server are frozen at the time T0, and any updates, upgrades, or patches will not be applied to the first server.

At block 214, the computer system 100 may instruct the first server at it full performance.

On the other hand, once the first server is duplicated onto the second sever, at block 220, the computer system 100 may instruct the second server to reboot.

At block 222, the computer system 100 may perform assessment and remediation on the second server. The assessment and remediation may include assessments and remediation in the areas of performance, security, and patch. In certain embodiments, the computer system 100 may run wide-sense assessment and remediation on the second server, including: performing Watson Security Tool (WST) style security assessments, applying patches, performing data compaction, and optimizing performance of the second server.

In certain embodiments, when the assessment and remediation are completed, the computer system 100 may further instruct the second server to verify and validate integrity of the remediation by running a variety of application tests to ascertain the second server is in a good operation condition to take over the operation of the first server.

At block 224, once the assessment and remediation are completed and the verification and the validation of the integrity of the remediation are completed, the computer system 100 may merge application data updates of the first server with remediation updates of the second server at a time T1. In one embodiment, the computer system 100 may merge application data updates of the first server with remediation updates of the second server using a log-shipping merging, when the first server supports log-shipping and replay. The log-shipping merging may include: instructing the first server to connect to the second server, instructing the first server to ship all logs to the second server between time T0 and time T1, and instructing the second server to replay all logs received. In another embodiment, the computer system 100 may merge the application data updates of the first server with remediation updates of the second server using a duplicating data merging. The duplicating data merging may include: instructing the first server to perform a flash copy of data volumes from the first server, and join the flash copy of the data volumes from the first server with the second server.

At block 226, when the assessment and remediation on the second server are completed, and the application data of the first server during the assessment and remediation of the second server is merged with the application data of the second server, the computer system 100 may perform identities swap between the first server and the second server. The identities swapping may include: quiescing the first server when the second server is fully synchronized with the first server, swapping identity of the second server with identity of the first server, and deleting the first server. In one embodiment, the computer system 100 may swap the identities of the first server and the second server using disaster recovery (DR) failover. In another embodiment, the computer system 100 may swap the identities of the first server and the second server using high availability (HA) failover. In yet another embodiment, the computer system 100 may swap the identities of the first server and the second server by simply updating of the hostname and IP address of the second server.

At block 216, once the identity swapping is completed, the (original) first server becomes a new second server, and the second server becomes a new first server. The computer system 100 may delete the new second server (the original first server).

At block 228, the computer system 100 may instruct the new first server to resume the new first server to operate at its full performance. At this moment, the assessment and remediation of the first server is completed.

In another embodiment of the present invention, a computer system for assessing and remediating online servers with minimal impact may include a processor, and a memory storing computer executable instructions for the computer system. When the computer executable instructions are executed at the processor, the computer executable instructions cause the computer system to perform: duplicating, in real-time at time T0, a first instance of computer resources of a first server into a second instance of computer resources of a second server, each of the first instance of computer resources and the second instance of computer resources including operating systems, applications and data, running assessment and remediation on the second instance of operating systems and applications of the second server, merging the second instance of data of the second server with the first instance of data of the first server, and swapping the identities of the first instance of computer resources of the first server and the second instance of computer resources of the second server.

In yet another embodiment, the present invention relates to a computer program product operable on a computer system for assessing and remediating online servers with minimal impact. The computer program product may include a non-transitory computer storage medium readable by the computer system having a processor and configured to store computer executable instructions for execution by the processor of the computer system for performing a method comprising: duplicating, in real-time at time T0, a first instance of computer resources of a first server into a second instance of computer resources of a second server, each of the first instance of computer resources and the second instance of computer resources including operating systems, applications and data, running assessment and remediation on the second instance of operating systems and applications of the second server, merging the second instance of data of the second server with the first instance of data of the first server, and swapping the identities of the first instance of computer resources of the first server and the second instance of computer resources of the second server.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of assessing and remediating online servers comprising:
   duplicating, in real-time at time T0, a first instance of computer resources of a first server into a second instance of computer resources of a second server, wherein the first instance of computer resources comprises a first instance of operating systems, a first instance of applications and a first instance of data, and the second instance of computer resources comprises a second instance of operating systems, a second instance of applications and a second instance of data;
   running assessment and remediation on the second instance of operating systems and the second instance of applications of the second server while the first server is still performing wherein the running comprises instructing the second server to perform:
      booting up the second server into a protected sandbox based on the duplicated first server,
      running assessment and remediation on the second server, and
      validating integrity of the remediation by running application test;
   merging the second instance of data of the second server with the first instance of data of the first server after running the assessment and the remediation; and
   swapping identities of the first instance of computer resources of the first server and the second instance of computer resources of the second server after the merging.

2. The method of claim 1, wherein the first server comprises an outage-free mission critical production server and a high availability production server, and the second server comprises a server similar to the first server in configuration.

3. The method of claim 1, wherein the duplicating comprises instructing the first server to perform:
   quiescing the applications of the first server for a time period for duplicating the first instance of computer resources of the first server into the second instance of computer resources of the second server;
   duplicating the first instance of computer resources of the first server into the second instance of computer resources of the second server;
   resuming the applications of the first server to full performance; and
   inhibiting all updates on the first server other than normal production data traffic.

4. The method of claim 1, wherein the running comprises:
   performing Watson Security Tool (WST) style security assessments;
   applying patches;
   performing data compaction; and
   optimizing performance of the second server.

5. The method of claim 1, wherein the merging comprises merging application data updates of the first server with remediation updates of the second server at time T1, using:
   log-shipping merging, when the first server supports log-shipping and replay, comprising:
      instructing the first server to connect to the second server;
      instructing the first server to ship all logs to the second server between time T0 and time T1; and
      instructing the second server to replay all logs received; and
   duplicating data merging comprising:
      performing a flash copy of data volumes from the first server; and
      joining the flash copy of the data volumes from the first server to the second server.

6. The method of claim 1, wherein the swapping comprises:
   quiescing the first server when the second server is fully synchronized with the first server;
   swapping identity of the second server with identity of the first server; and deleting the first server.

7. A computer system for assessing and remediating online servers comprising a processor and a memory storing computer executable instructions for the computer system which, when executed at the processor of the computer system, are configured to perform:
   duplicating, in real-time at time T0, a first instance of computer resources of a first server into a second instance of computer resources of a second server, wherein the first instance of computer resources comprises a first instance of operating systems, a first instance of applications and a first instance of data and the second instance of computer resources comprises a second instance of operating systems, a second instance of applications and a second instance of data;
   running assessment and remediation on the second instance of operating systems and the second instance of applications of the second server while the first server is still performing, wherein the running comprises instructing the second server to perform:
      booting up the second server into a protected sandbox based on the duplicated first server,
      running assessment and remediation on the second server, and
      validating integrity of the remediation by running application test;
   merging the second instance of data of the second server with the first instance of data of the first server after running the assessment and the remediation; and
   swapping identities of the first instance of computer resources of the first server and the second instance of computer resources of the second server after the merging.

8. The computer system of claim 7, wherein the first server comprises an outage-free mission critical production server and a high availability production server, and the second server comprises a server similar to the first server in configuration.

9. The computer system of claim 7, wherein the duplicating comprises instructing the first server to perform:
   quiescing the applications of the first server for a time period for duplicating the first instance of computer resources of the first server into the second instance of computer resources of the second server;
   duplicating the first instance of computer resources of the first server into the second instance of computer resources of the second server;
   resuming the applications of the first server to full performance; and
   inhibiting all updates on the first server other than normal production data traffic.

10. The computer system of claim 7, wherein the running comprises:
   performing Watson Security Tool (WST) style security assessments;

applying patches;
performing data compaction; and
optimizing performance of the second server.

11. The computer system of claim 7, wherein the merging comprises: merging application data updates of the first server with remediation updates of the second server at time T1, using:
   log-shipping merging, when the first server supports log-shipping and replay, comprising:
      instructing the first server to connect to the second server;
      instructing the first server to ship all logs to the second server between time T0 and time T1; and
      instructing the second server to replay all logs received; and
   duplicating data merging comprising:
      performing a flash copy of data volumes from the first server; and
      joining the flash copy of the data volumes from the first server to the second server.

12. The computer system of claim 7, wherein the swapping comprises:
   quiescing the first server when the second server is fully synchronized with the first server;
   swapping identity of the second server with identity of the first server; and
   deleting the first server.

13. A non-transitory computer program product comprising a non-transitory computer storage medium storing computer executable instructions for a computer system having a processor to execute the instructions for accessing and remediating online servers by performing a method comprising:
   duplicating, in real-time at time T0, a first instance of computer resources of a first server into a second instance of computer resources of a second server, wherein the first instance of computer resources comprises a first instance of operating systems, a first instance of applications and a first instance of data and the second instance of computer resources comprises a second instance of operating systems, a second instance of applications and a second instance of data;
   running assessment and remediation on the second instance of operating systems and the second instance of applications of the second server while the first server is still performing, wherein the running comprises instructing the second server to perform:
      booting up the second server into a protected sandbox based on the duplicated first server,
      running assessment and remediation on the second server, and
      validating integrity of the remediation by running application test;
   merging the second instance of data of the second server with the first instance of data of the first server after running the assessment and the remediation; and
   swapping identities of the first instance of computer resources of the first server and the second instance of computer resources of the second server after the merging.

14. The non-transitory computer program product of claim 13, wherein the first server comprises an outage-free mission critical production server and a high availability production server, and the second server comprises a server similar to the first server in configuration.

15. The non-transitory computer program product of claim 13, wherein the duplicating comprises instructing the first server to perform:
   quiescing the applications of the first server for a time period for duplicating the first instance of computer resources of the first server into the second instance of computer resources of the second server;
   duplicating the first instance of computer resources of the first server into the second instance of computer resources of the second server;
   resuming the applications of the first server to full performance; and
   inhibiting all updates on the first server other than normal production data traffic.

16. The non-transitory computer program product of claim 13, wherein the running comprises: performing Watson Security Tool (WST) style security assessments; applying patches; performing data compaction; and optimizing performance of the second server.

17. The non-transitory computer program product of claim 13, wherein the merging comprises merging application data updates of the first server with remediation updates of the second server at time T1, using:
   log-shipping merging, when the first server supports log-shipping and replay, comprising:
      instructing the first server to connect to the second server;
      instructing the first server to ship all logs to the second server between time T0 and time T1; and
      instructing the second server to replay all logs received; and
   duplicating data merging comprising:
      performing a flash copy of data volumes from the first server; and
      joining the flash copy of the data volumes from the first server to the second server.

18. The non-transitory computer program product of claim 13, wherein the swapping comprises:
   quiescing the first server when the second server is fully synchronized with the first server;
   swapping identity of the second server with identity of the first server; and
   deleting the first server.

* * * * *